(No Model.)  
T. G. LEE.  
FRICTION CLUTCH.  
No. 549,454.  
2 Sheets—Sheet 2.  
Patented Nov. 5, 1895.
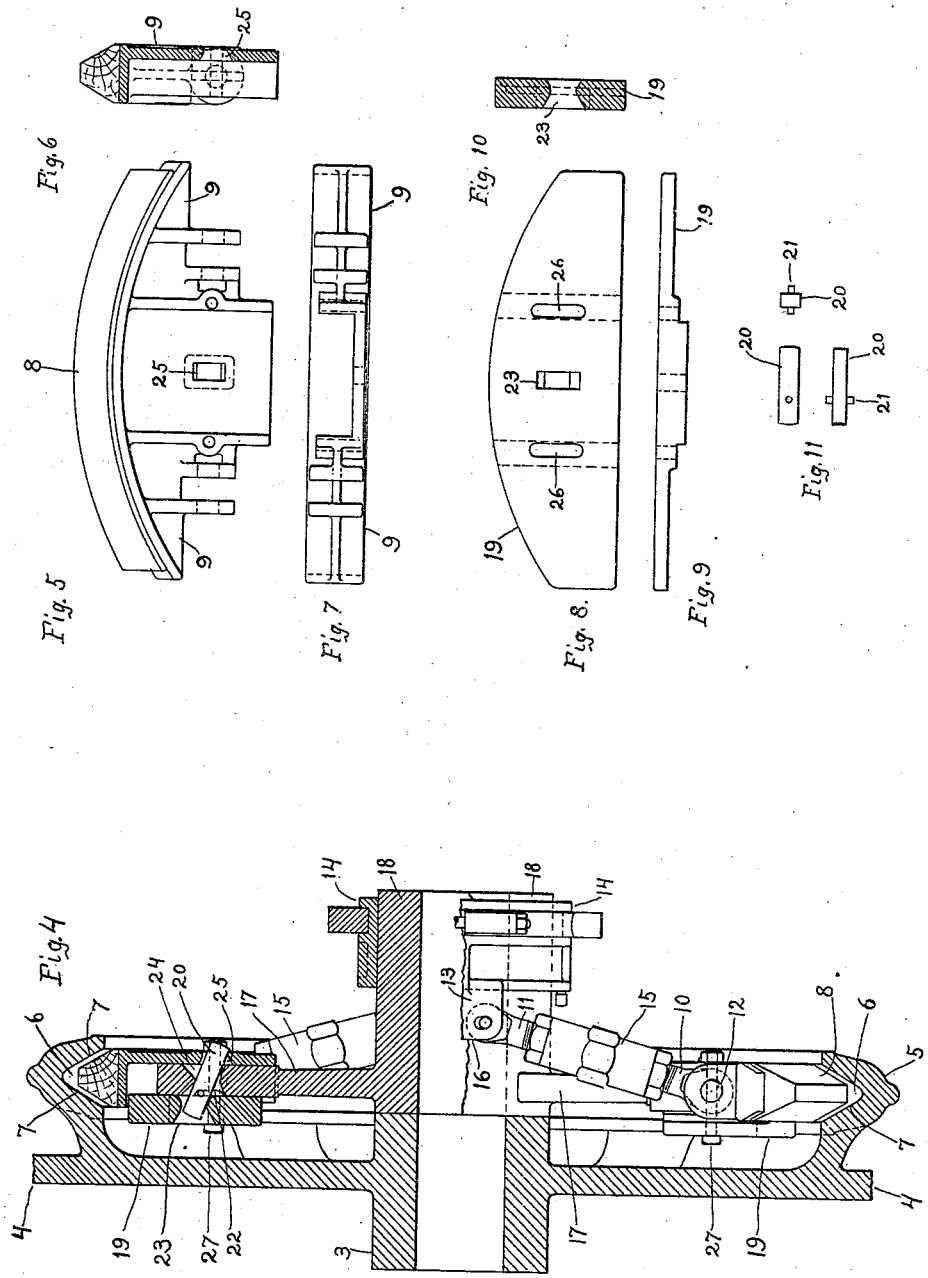
Witnesses  
R. Blume  
John J Martin
Inventor  
Thomas G. Lee  
By Attorney  
P. H. Gunekel

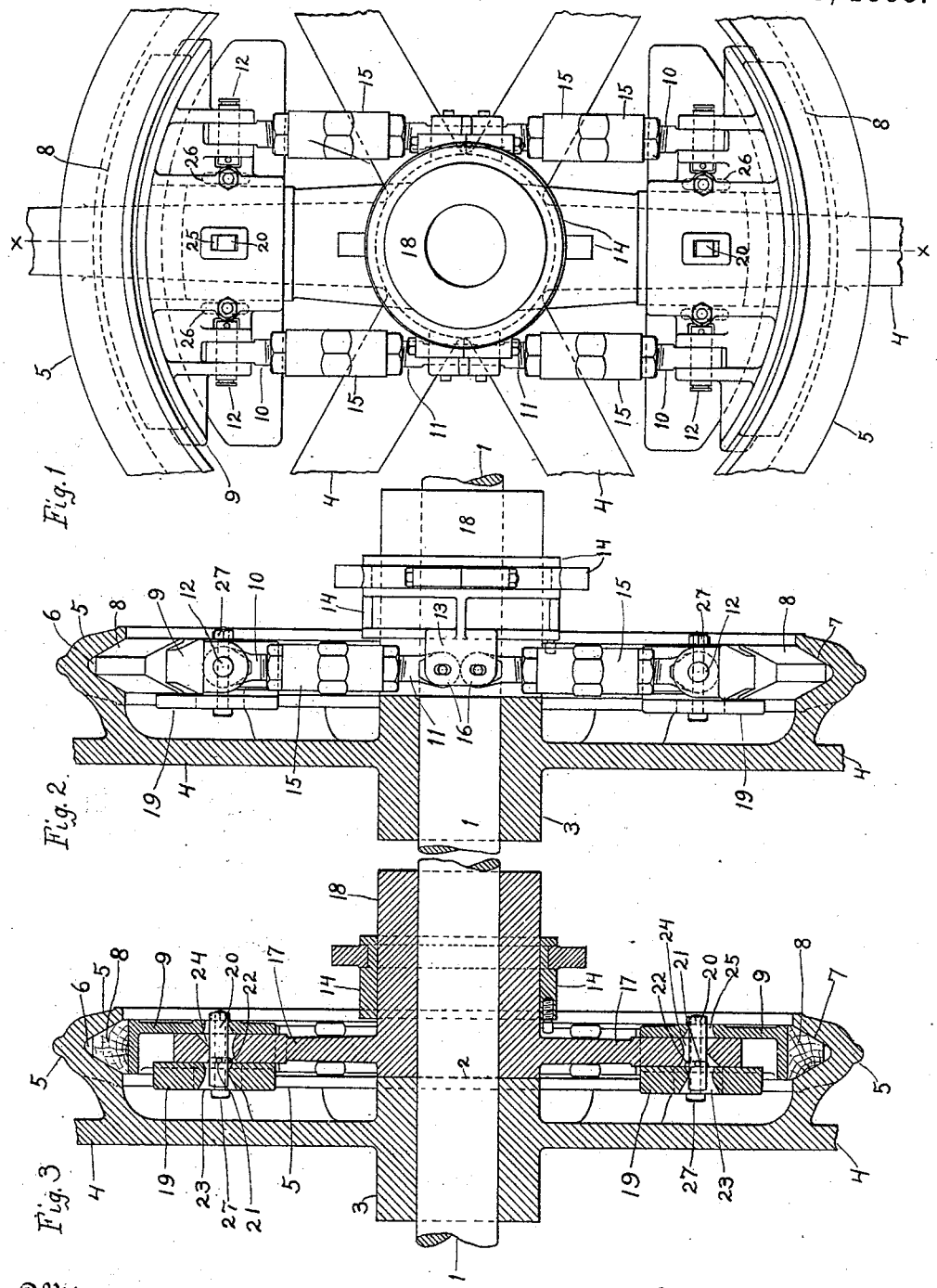

UNITED STATES PATENT OFFICE.

THOMAS G. LEE, OF MINNEAPOLIS, MINNESOTA, ASSIGNOR TO THE TWIN CITY IRON WORKS, OF SAME PLACE.

FRICTION-CLUTCH.

SPECIFICATION forming part of Letters Patent No. 549,454, dated November 5, 1895.

Application filed May 6, 1895. Serial No. 548,191. (No model.)

*To all whom it may concern:*

Be it known that I, THOMAS G. LEE, a citizen of the United States, residing in the city of Minneapolis, county of Hennepin, and State of Minnesota, have invented certain new and useful Improvements in Friction-Clutches, of which the following is a specification.

My invention relates to clutches in which frictional driving devices under the control of an operator are used for controlling the rotation of the member to be driven.

The object of the present invention is improvement of devices of the character illustrated in Patent No. 520,102, of May 22, 1894, to A. Harvey for friction-clutch, by means of which improvement it is sought to obviate the tendency of the friction-shoes to move by the action of centrifugal force under high rates of speed to engagement with the friction-ring when such engagement is not desired.

Briefly and generally stated, the present improvement consists in supplying a suitably-connected counterbalance-weight arranged and adapted to neutralize the effects of centrifugal force upon the frictional devices when subjected to high rates of speed.

It has been demonstrated by practical use of the devices that mechanisms of the character of the Harvey patent referred to, while thoroughly efficient when the revolutions are within the limit of about three hundred to three hundred and fifty a minute, when the speed is increased to five hundred or more revolutions there is a tendency, by reason of the increased centrifugal effect of the higher rate of speed, to cause an undesired frictional engagement of the clutching devices, which in some instances results in the locking of the devices, so as to cause rotation of the ring, and in other instances results in wearing off the frictional surfaces of the shoes.

In illustration of my improvements I have shown in the accompanying drawings appropriate portions of a friction-clutch mechanism similar to that illustrated by the Harvey patent alluded to, in which—

Figure 1 is an elevation of the mechanism viewed in line with the driving-shaft. Fig. 2 is a vertical section showing one set of the clutch devices of Fig. 1 in elevation. Fig. 3 is a similar section on the line $x\ x$ of Fig. 1, showing the clutching devices in vertical section. All of these views show the clutch devices in engagement with the driving-ring. Fig. 4 shows the clutch devices disengaged, the upper portion being a central vertical section similar to Fig. 3, and the lower portion a vertical section similar to the lower portion of Fig. 2, and Figs. 5 to 11, inclusive, show various details, to be hereinafter fully described.

In such drawings, 1 designates a shaft, which may be continuous through the devices or composed of two separate portions, as indicated at the line 2, so that the one portion will operate in connection with a pulley or like device and the other in connection with a friction-ring for operating the pulley when properly engaged. The hub of a pulley or equivalent member is indicated by 3 and its spokes by 4, the hub 3 being secured by a key or in any suitable way to the shaft 1. A friction-ring 5° is cast integrally with or secured to the spokes 4 of the pulley, and the ring has an internal annular groove 6, the walls 7 of which are inclined to provide suitable frictional surfaces for beveled friction-shoes 8, which are arranged to enter such groove at diametrically-opposite sides of the shaft. These shoes are on carriers 9, that are supported by two-part lever-arms 10 and 11, connected by pivots 12 to the shoe-carriers and to flanges or arms 13, provided on a shifter 14, and which extend toward the pulley. The two lever-arms 10 and 11 for each carrier have their adjacent ends screw-threaded and are connected by a turnbuckle 15, which enables them to be adjusted so as to regulate the aggregate length of the lever-arms on the opposite sides of the shaft. The portions 10 enter slots in the carriers 9, to which they are connected by pivots, while the portions 11 are connected to the shifter-arms 13 by pivots which pass through oblong slots therein, so that the levers may have slight play in direction of their length—that is, radial play within the ring. The adjustment of the lever-arms 10 and 11 and of the turnbuckles at opposite sides of the shaft should be such that when the shifter is moved inward the inner ends of the arms 11 will abut while the friction-shoes are in working position. These abutting ends are rounded, as shown at 16, so that they may roll on each other as the devices are shifted to and from operative positions. By these means the pressure of the shoes against the ring at opposite sides of the shaft is made self-equalizing, and the degree of pressure may be regulated as required by operating the turnbuckles. The shifter may be operated by a lever or any other suitable means. The levers for operating the shoe-carriers are guided and reinforced by means of arms 17, extending from a hub 18, the shifter being arranged to slide on the hub 18 and the hub being suitably connected to the shaft. The parts so far described are substantially as shown in the Harvey patent referred to. It will be noted, however, that while in the Harvey clutch the ring is secured to the pulley-spokes by bolts, in the present instance the ring is cast integrally with the pulley.

To overcome the undesirable effect of centrifugal force upon the shoes in such mechanisms as have been described, there is provided, in the present instance, as illustrated in the drawings, a counterbalance-weight 19, having suitable connections with the shoe-carrier to move the latter centripetally when the former is moved centrifugally. This weight may be a plate or other body of suitable size and weight to serve the desired end. It is supported at the inner side of the arms 17 by means of a lever 20, having a pin 21, arranged to slide in an oblong slot 22, formed in and lengthwise of the arm 17. Suitable lateral slots, numbered 23, 24, and 25, respectively, are formed in the counterbalance, the arm, and the shoe-carrier, respectively, and these have their opposite walls so tapered or rounded as to permit the pivoted lever 20 to roll or slide upon them and turn on its loose pivot 21 when the counterbalance or the shoe-carrier is given movement in direction radial to the ring. In the counterbalance, some distance at the sides of its median radial line, are formed slots 26, through which loosely pass bolts 27, that are secured to the shoe-carrier, and which, while permitting the counterbalance to move radially, guide its movements in true radial direction. It will be understood that the counterbalance is entirely free from the shoes, except as it is supported and guided by the bolts 27, and that its radial movements control or are controlled by the operation of the lever 20, so that when the shifter is operated an outward movement of the carrier will move correspondingly the lever 20 and so thrust the counterbalance toward the shaft. On the other hand the outward radial movement of the counterbalance will move outward the end of the lever 20, with which it is in contact, and so move the opposite end toward the shaft, carrying with it the shoe-carrier. Obviously the specific devices shown and described may be varied considerably without departing from the general plan of operation.

It will probably be apparent that in operation, the counterbalance being of suitable weight and proportions and arranged substantially as described, the effect of centrifugal force under high rates of speed, the shoe being free from the ring, will be to throw the counterbalance outward as well as the shoe-carrier, when by means of the lever 20 the outward movement of the counterbalance will produce a corresponding inward movement of the shoe-carrier and thereby prevent contact of the shoe with the ring. Extensive use has demonstrated the entire practicability of a counterbalance arranged substantially in the manner suggested for obviating frictional contact of the shoes at times when not desired, and so avoiding not only unnecessary wear of the shoes or the rotation of the pulley when not desired, but also renders the manipulation of the shifter an easy matter even when the shoe is in contact with the ring and it is desired to disengage it. It will be understood that with the use of former devices, when the shoes are in engagement with the ring and the speed is high, it is sometimes difficult to move the shifter to cause disengagement of the shoes and ring. This difficulty is entirely obviated by the present devices.

Having described my invention, what I claim is—

1. In a friction-clutch, the combination with a shoe-carrier, of a counter-balance weight, a connection between the carrier and weight, and a fulcrum for such connection, whereby the weight may counteract the centrifugal movement of the shoe-carrier, substantially as set forth.

2. In a friction-clutch, the combination with a friction-ring, of a shoe and its carrier, an arm for guiding the latter, a counter-balance, and a lever fulcrumed in said arm and arranged to engage the carrier and counterbalance so as to move the one radially inward as the other is moved radially outward, substantially as set forth.

3. In a friction-clutch, the combination with a suitable member to be driven by frictional contact, of shoes for driving it, carriers for the shoes, arms for guiding the carriers, toggle devices and a shifter for operating the shoe-carriers, counter-balance weights arranged to be guided by said arms, levers having suitable bearings in slots in the arms and in the weights and carriers, whereby centrifugal movement of the weights will retract the carriers to prevent frictional contact of the shoes with the member to be driven, substantially as set forth.

THOMAS G. LEE.

Witnesses:
JOSEPH GARBETT,
P. H. GUNCKEL.